(12) United States Patent
Greenlee et al.

(10) Patent No.: US 11,577,977 B2
(45) Date of Patent: Feb. 14, 2023

(54) COMPOSITE ZERO VALENT IRON NANOPARTICLES AND APPLICATIONS THEREOF

(71) Applicants: The Board of Trustees of the University of Arkansas, Little Rock, AR (US); TRIAD GROWTH PARTNERS, LLC, Greensboro, NC (US)

(72) Inventors: Lauren Greenlee, Fayetteville, AR (US); Mojtaba Abolhassani, Fayetteville, AR (US); Charles Boyd Gause, Providence, NC (US); Colm Griffith Humphreys, Millbrae, CA (US); Alexis Wells Carpenter, Greensboro, NC (US)

(73) Assignees: THE BOARD OF TRUSTEES OF THE UNIVERSITY OF ARKANSAS, Little Rock, AR (US); TRIAD GROWTH PARTNERS, LLC, Greensboro, NC (US)

( * ) Notice: Subject to any disclaimer, the term of this patent is extended or adjusted under 35 U.S.C. 154(b) by 0 days.

(21) Appl. No.: 16/651,124

(22) PCT Filed: Sep. 26, 2018

(86) PCT No.: PCT/US2018/052905
§ 371 (c)(1),
(2) Date: Mar. 26, 2020

(87) PCT Pub. No.: WO2019/067580
PCT Pub. Date: Apr. 4, 2019

(65) Prior Publication Data
US 2020/0283313 A1  Sep. 10, 2020

Related U.S. Application Data

(60) Provisional application No. 62/563,403, filed on Sep. 26, 2017.

(51) Int. Cl.
C02F 1/70 (2006.01)
C02F 101/20 (2006.01)
(Continued)

(52) U.S. Cl.
CPC .......... C02F 1/705 (2013.01); *C02F 2101/20* (2013.01); *C02F 2101/36* (2013.01);
(Continued)

(58) Field of Classification Search
None
See application file for complete search history.

(56) References Cited

U.S. PATENT DOCUMENTS 2,275,281 A * 3/1942 Berl ..................... H01M 12/06
429/513
4,568,442 A * 2/1986 Goldsmith .......... H01M 4/8885
204/284

(Continued)

OTHER PUBLICATIONS

International Search Report and Written Opinion corresponding to PCT/US2018/052905, dated Jan. 28, 2019, 14 pages.
(Continued)

*Primary Examiner* — Chester T Barry
(74) *Attorney, Agent, or Firm* — J. Clinton Wimbish; Nexsen Pruet, PLLC

(57) ABSTRACT

In one aspect, composite particles are described herein. A composite particle comprises a substrate, composite metallic or metal oxide nanoparticles supported by the substrate and an amphiphilic or hydrophilic component associated with the substrate, wherein the composite metallic or metal oxide nanoparticles comprise iron and at least one additional transition metal.

21 Claims, 14 Drawing Sheets

(51) Int. Cl.
*C02F 101/36* (2006.01)
*C02F 101/38* (2006.01)
*C02F 103/06* (2006.01)

(52) U.S. Cl.
CPC ...... *C02F 2101/38* (2013.01); *C02F 2103/06* (2013.01); *C02F 2305/08* (2013.01)

(56) References Cited

U.S. PATENT DOCUMENTS

| | | | | |
|---|---|---|---|---|
| 6,280,871 | B1* | 8/2001 | Tosco | H01M 4/8605 429/405 |
| 10,316,313 | B2* | 6/2019 | Corgie | C12N 9/0065 |
| 2003/0134409 | A1* | 7/2003 | Mallouk | B09C 1/08 435/262.5 |
| 2005/0095189 | A1 | 5/2005 | Brey et al. | |
| 2009/0215615 | A1* | 8/2009 | Mao | H01M 4/921 502/326 |
| 2011/0104072 | A1* | 5/2011 | Bales | A61K 49/186 562/15 |
| 2014/0162868 | A1* | 6/2014 | Greenlee | B01J 23/755 502/337 |
| 2014/0194280 | A1 | 7/2014 | Osaki et al. | |
| 2015/0328629 | A1* | 11/2015 | Cho | B82B 3/00 502/182 |
| 2016/0051708 | A1* | 2/2016 | Lee | H01M 4/8652 252/182.1 |
| 2016/0160207 | A1* | 6/2016 | Domínguez Vera | A61K 35/744 424/93.4 |
| 2018/0117185 | A1* | 5/2018 | Cheng | A61K 49/186 |
| 2018/0221850 | A1* | 8/2018 | Pradeep | B01J 20/205 |
| 2019/0345050 | A1* | 11/2019 | Lead | C02F 3/344 |

OTHER PUBLICATIONS

Wei-xian Zhang, "Nanoscale iron particles for environmental remediation: an overview.", Journal of nanoparticle Research 5.3 4 (Aug. 1, 2003). 323-332. (p. 323, col. 2, para 2), (p. 324, col. 1, para 1), (p. 326, col. 1, para 2- col. 2, para 2), Figure 1, Table 1.

Niraula, et al, "Sodium dodecylsulphate: A very useful Surfactant for Scientific Investigations.", The Journal of Knowledge and Innovation, vol. 2, No. 1, (Feb. 2014) 111-113. (p. 111 col 2, para 4).

Fonder, Sherman M., et al.,"Surface chemistry and electrochemistry of supported zerovalent iron nanoparticles in the remediation of aqueous metal contaminants." Chemistry of Materials 13.2 (Feb. 19, 2001): 479-486. Entire Document.

* cited by examiner

US 11,577,977 B2

COMPOSITE ZERO VALENT IRON NANOPARTICLES AND APPLICATIONS THEREOF

This application is a U.S. National Phase of PCT/US2018/052905, filed Sep. 26, 2018, which claims priority under 35 U.S.C. § 119(e) to U.S. Provisional Patent Application No. 62/563,403, filed Sep. 26, 2017, each of which is hereby incorporated by reference in its entirety herein.

FIELD

The present invention relates to particulate compositions and, in particular, to composites containing metallic or metal oxide particles supported by a conductive substrate and stabilized by an amphiphilic or hydrophilic component.

BACKGROUND

Eleven billion tons of contaminated industrial waste are generated each year. Concurrently, the public and government place a high priority on providing clean, uncontaminated water for consumption and quality of life. In addition, there is continued interest to address contaminated soils, sediments, and air quality, all of which can be affected by water contaminants. Therefore, there is a large market for water treatment and groundwater remediation with associated treatments or management of soil, sediments, and air quality. The current United States remediation market alone is estimated to be worth 60 billion dollars.

A variety of strategies exist to facilitate groundwater cleanup. Some involve pumping water out of the aquifer and treating it above ground, while other strategies, called in situ technologies, focus on treating contaminants "as they lie" in the subsurface. In situ technologies remediate groundwater by introducing chemicals to the subsurface that degrade contaminants or stimulate biological degradation of the contaminants. Zero valent iron has been a focus of remediation research because of the ability to reduce and degrade a variety of organic contaminants and heavy metals. However, current zero valent iron technologies have issues and limitations, including their stability and ability to move within the aquifer matrix in the subsurface. Due to extremely high reactivity, zero valent iron particles will quickly react with a wide variety of compounds in groundwater, forming larger oxides that are less reactive and less mobile in the matrix.

SUMMARY

In view of the foregoing disadvantages, composite particle compositions are described herein exhibiting resistance to oxidation, improved reactivity, and increased mobility in porous matrices. In one aspect, a composite particle comprises a substrate, composite metallic or metal oxide nanoparticles supported by the substrate and an amphiphilic or hydrophilic component associated with the substrate, wherein the composite metallic or metal oxide nanoparticles comprise of iron and may include at least one additional transition metal. In some embodiments, the iron of the composite metallic nanoparticles is zero valent iron. Moreover, the substrate can be electrically conductive, thereby facilitating reductive degradation of various water contaminants contacting the composite particle.

In another aspect, methods of water remediation are described herein. A method of water remediation comprises contacting a water source comprising one or more contaminants with a remediation composition, the remediation composition comprising composite particles, the composite particles comprising a substrate, composite metallic or metal oxide nanoparticles supported by the substrate and an amphiphilic or hydrophilic component associated with the substrate, wherein the composite metallic or metal oxide nanoparticles comprise iron and may include at least one additional transition metal.

In a further aspect, methods of making composite particles are described. A method of making composite particles comprises providing composite metallic or metal oxide nanoparticles in a continuous liquid phase and depositing the composite nanoparticles on substrate particles. As described herein, the composite metallic or metal oxide nanoparticles comprise iron and may include at least one additional transition metal. An amphiphilic or hydrophilic component is associated with the substrate particles and/or with the composite nanoparticles. In some embodiments, the amphiphilic or hydrophilic component forms a partial or complete coating for the composite particles.

These and other embodiments are further described in the following detailed description.

DETAILED DESCRIPTION

Figure 1:
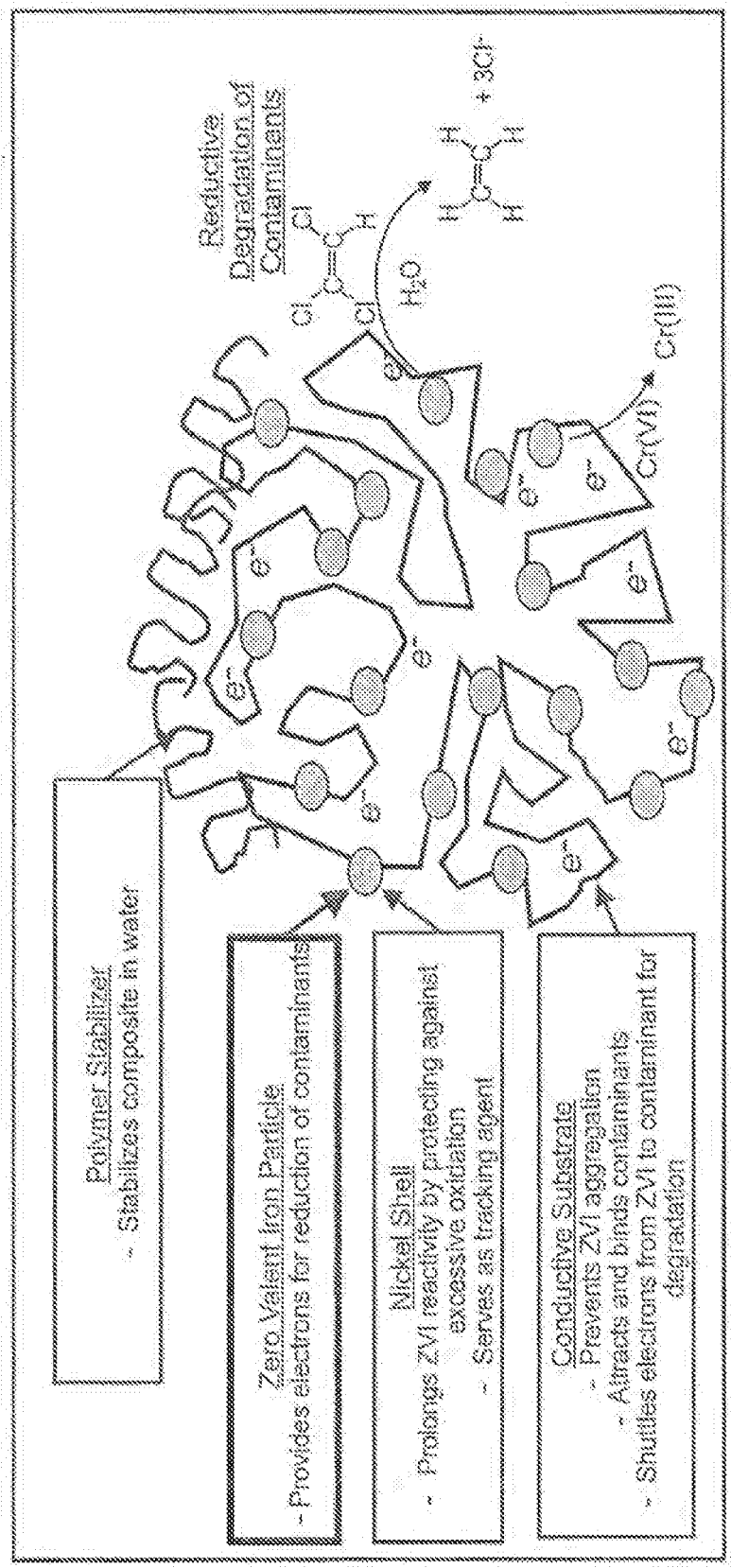
FIG. 1 illustrates a composite particle according to some embodiments described herein.

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In one aspect, composite particles are described herein. A composite particle comprises a substrate, composite metallic or metal oxide nanoparticles supported by the substrate and an amphiphilic or hydrophilic component associated with the substrate, wherein the composite metallic nanoparticles comprise iron and may include at least one additional transition metal. Turning now to specific components, iron of the composite metallic nanoparticles, in some embodiments, exhibits an oxidation state of zero, otherwise described as zero valent iron. The at least one additional transition metal of the composite metallic nanoparticles can be selected according to several considerations including, but not limited to, enhancing the oxidation resistance of the iron. In some embodiments, the at least one additional transition metal is selected from Group VIIIB of the Periodic Table. For example, the at least one additional transition metal can be nickel. Alternatively, two or more Group VIIIB metals can be present in the composite metallic nanoparticles. In some embodiments, nickel and palladium are present along with iron in the composite metallic nanoparticles. The ratio of nickel to palladium in the composite metallic nanoparticles can be selected according to considerations including enhancements to iron oxidation resistance, control of metal leaching, control of nanoparticle stability, and cost. As described further herein, the composite metallic or metal oxide nanoparticles can exhibit various morphologies, including core-shell or alloy architectures. In some embodiments, the composite metallic nanoparticles comprise an iron core and shell formed of the at least one additional transition metal. In some embodiments, the shell can be an oxide.

The substrate can comprise any material consistent with water remediation objectives described herein. In some embodiments, the substrate is electrically conductive. In being electrically conductive, the substrate can pass electrons to or from the metallic nanoparticles for reduction of contaminants. In this way, the contaminants are not necessarily required to directly contact the composite metallic nanoparticles for reductive degradation. The substrate can also be porous, providing ample surface area for the composite metallic nanoparticles and accommodating a high number of contact sites for the contaminants. In some embodiments, the substrate comprises electrically conductive carbon, such as carbon black. In some embodiments, an average particle size of the substrate ranges from 30 nanometers (nm) to 50 micrometers (μm). Average particle size of the substrate can also have a value selected from Table I.

TABLE I

Average Substrate Particle Size

| 50 nm to 20 μm |
| 100 nm to 1 μm |
| 250 nm to 750 nm |
| 300 nm to 600 nm |
| 1 μm to 30 μm |
| 500 nm to 20 μm |
| 5 μm to 50 μm |
| 10 μm to 50 μm |

The substrate may also exhibit surface area ranging from 100 $m^2/g$ to 2,000 $m^2/g$. In some embodiments, surface area of the substrate ranges from 200 to 500 $m^2/g$ or 1,000 to 1,700 $m^2/g$. Substrate surface area is determined according to BET methods described below. Additionally, the substrate can exhibit pore volume of 0.1 to 5 cc/g, in some embodiments. The substrate, for example, can have a pore volume of 0.2 to 3 cc/g.

The amphiphilic or hydrophilic component can comprise any species operable to stabilize the composite particle and/or enhance mobility of the composite particle in a porous matrix through which water flows. In some embodiments, the amphiphilic or hydrophilic component comprises one or more amphiphilic or hydrophilic polymeric species. Suitable amphiphilic polymeric species can be selected to have hydrophobic moieties for interaction with the substrate and hydrophilic moieties for dispersing the composite particles in aqueous compositions. For example, amphiphilic or hydrophilic polymer species can include polyvinylpyrrolidone (PVP) or a derivative thereof. Accordingly, the amphiphilic or hydrophilic component can enhance composite particle mobility in aquifer matrices and inhibit or preclude composite particle aggregation. The amphiphilic or hydrophilic component can be associated with the substrate through one or more types of interactions, including hydrophobic and/or hydrophilic interactions.

FIG. 1 illustrates a composite particle according to some embodiments described herein. As illustrated in FIG. 1, the composite metallic nanoparticles are supported by the porous and electrically conductive substrate. The composite metallic nanoparticles comprise a zero valent iron core and nickel shell. The amphiphilic or hydrophilic polymer component associated with the substrate is also illustrated.

In another aspect, methods of water remediation are described herein. A method of water remediation comprises contacting a water source comprising one or more contaminants with a remediation composition, the remediation composition comprising composite particles, the composite particles comprising a substrate, composite metallic or metal oxide nanoparticles supported by the substrate and an amphiphilic or hydrophilic component associated with the substrate, wherein the composite metallic nanoparticles comprise iron and may include at least one additional transition metal. The composite particles can have any construction described above. The method further comprises reductively degrading the one or more contaminants with the composite particles. Referring once again to FIG. 1, heavy metals and organic compounds are reductively degraded by contact with the composite particles. In the non-limiting embodiment of FIG. 1, chromium (VI) is reduced to chromium (III) and trichloroethylene (TCE) is reduced to ethylene and chloride. The water contaminants are not required to directly contact the composite metallic nanoparticles on the substrate to effectuate reductive degradation. In being electrically conductive, the substrate can pass electrons from the composite metallic nanoparticles for reduction of water contaminants.

In a further aspect, methods of making composite particles are described. A method of making composite particles comprises providing composite metallic nanoparticles in a continuous liquid phase and depositing the composite metallic nanoparticles on substrate particles. As described herein, the composite metallic nanoparticles comprise iron and at least one additional transition metal. An amphiphilic or hydrophilic component is associated with the substrate particles. The amphiphilic or hydrophilic component can form a partial or complete coating for the composite particles.

Figure 2:
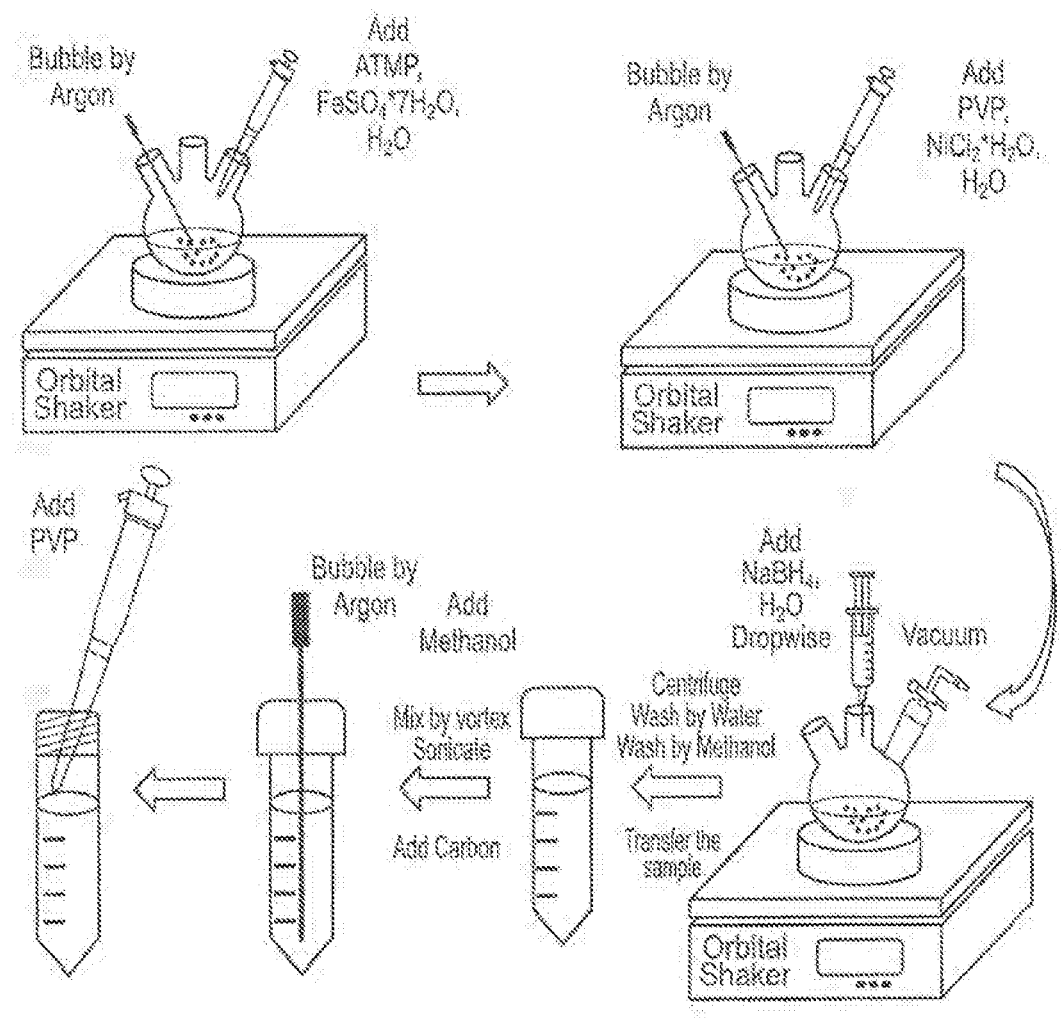
FIG. 2 illustrates a method of producing composite nanoparticles according to some embodiments.

In some embodiments, providing the composite metallic nanoparticles comprises adding iron salt and salt of the at least one additional transition metal to polar solvent, producing cations of iron and cations of the additional transition metal. One or more stabilizers are added to the polar solvent, and the cations are reduced with reductant to form the composite metallic nanoparticles. The stabilizer(s) can control growth and size of the composite metallic nanoparticles. In some embodiments, a stabilizer comprises one or more amphiphilic or hydrophilic polymeric species such as polyvinylpyrrolidone (PVP), a phosphonic acid such as amino tris(methylene phosphonic acid) (ATMP), or a derivative thereof. Moreover, depositing the composite metallic nanoparticles on the substrate particles can comprise adding the substrate particles to a suspension of the composite metallic nanoparticles and incubating the resultant mixture for a desired time period. Additionally, associating an amphiphilic or hydrophilic component with the substrate particles can comprise adding the amphiphilic or hydrophilic component to the suspension of the composite metallic nanoparticles and substrate particles. FIG. 2 illustrates a method of producing composite nanoparticles according to some embodiments.

Composite particles having the construction illustrated in FIG. 1 and formed according to the method of FIG. 2 were tested for reductive degradation of trichloroethylene (TCE). Table II provides results of the testing. As provided in Table II, the composite particles exhibited the highest TCE degradation relative to other particle compositions. Various carbon substrates were employed and exhibited a direct effect on TCE removal efficiency.

TABLE II

TCE Reductive Degradation

| | TCE Removal (C/Co) | |
|---|---|---|
| | 2 hours | 24 hours |
| Blank (TCE) | 1 | 0.94 |
| Metallic Nanoparticles alone | 0.91 | 0.74 |
| Composite on Carbon 1 | 0.26 | 0.15 |
| Composite on Carbon 2 | 0.43 | 0.13 |
| Composite on Carbon 3 | 0.52 | 0.25 |
| Composite on Carbon 4 | 0.54 | 0.33 |
| Composite on Carbon 5 | 0.51 | 0.16 |

Figure 3:
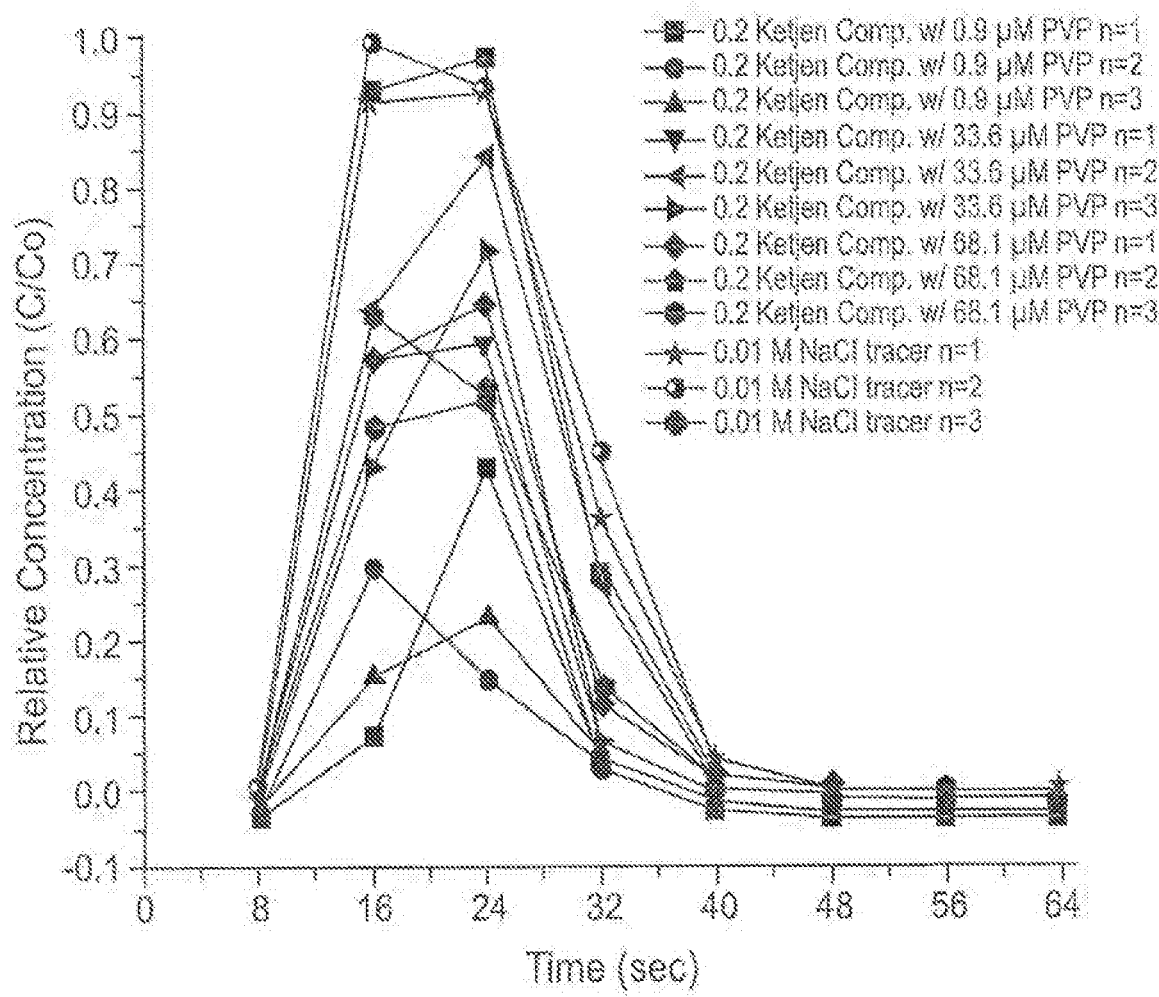
FIG. 3 illustrates composite particle mobility in a porous matrix through which water is flowed according to some embodiments.
Figure 4:
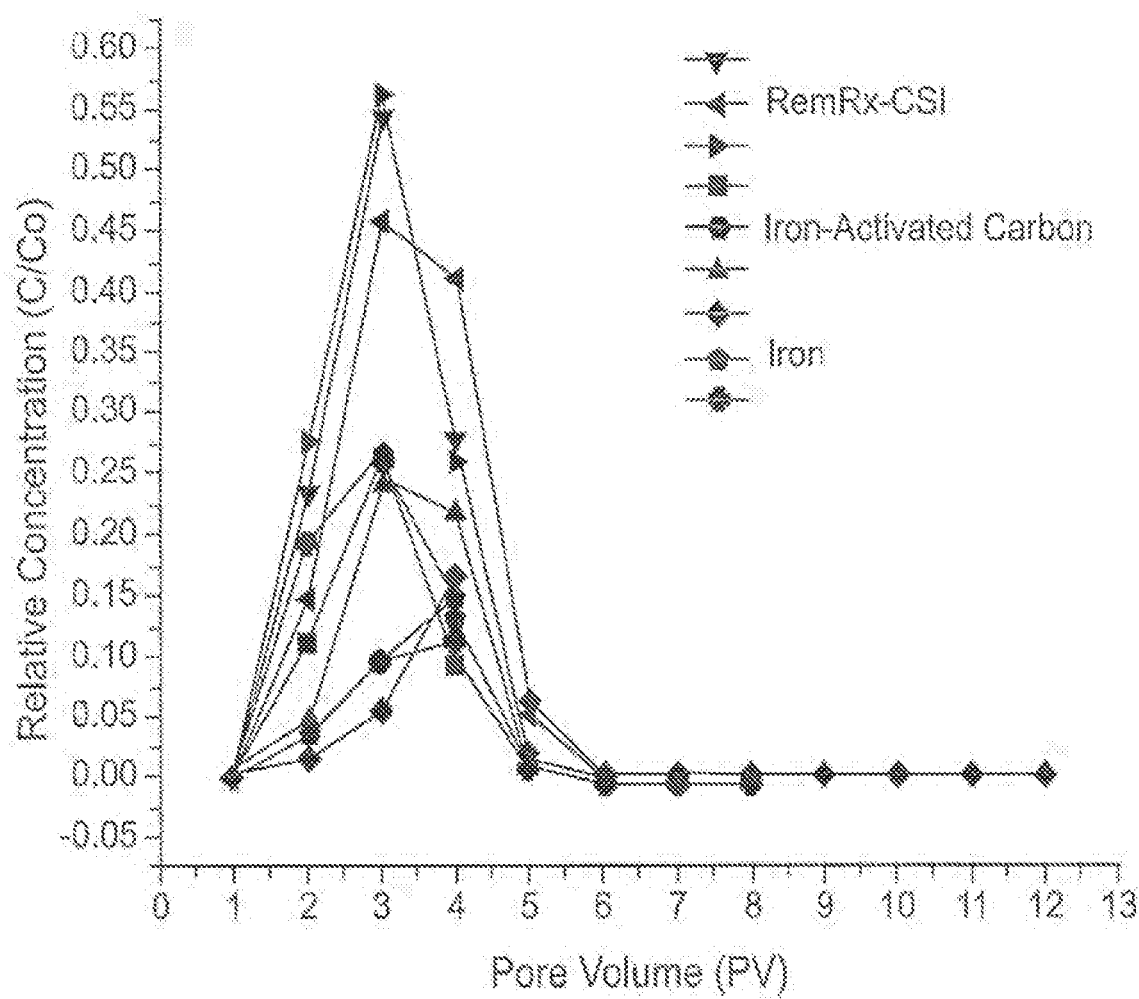
FIG. 4 illustrates composite particle mobility in a porous matrix through which water is flowed according to some embodiments.

Composite particles illustrated in FIG. 1 and formed according to the method of FIG. 2 were also tested for passage through porous media. Studies using a hollow glass column packed with saturated (with water) sand were conducted to model the porous media of the aquifer. The sand column was attached to a peristaltic pump which created a flow of water through the sand. Composite particle suspensions were loaded on top of the column, and the amount of composite particles flowing out of the sand column represented the composite particles' ability to move through the porous media. The relative concentration of composite particle suspension in the effluent out of the column compared to the concentration of composite particle suspension loaded onto the column was measured as a function of volume of water passed through the column. As illustrated in FIG. 3, the addition of PVP amphiphilic or hydrophilic component increased composite particle mobility in the sand. Composite particles comprising PVP amphiphilic or hydrophilic component also moved better than both iron/nickel particles on activated carbon and iron/nickel particles alone, as illustrated in FIG. 4.

Figure 5A:
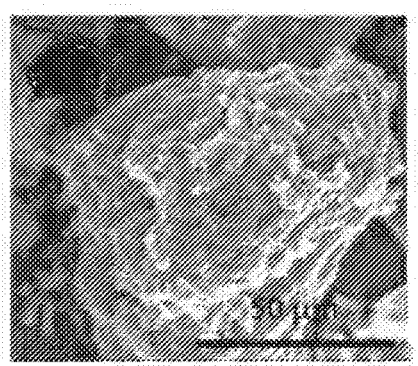
FIGS. 5A-5C are Scanning Electron Microscopy (SEM) images of a Carbon 1 substrate at different resolutions.
Figure 5B:
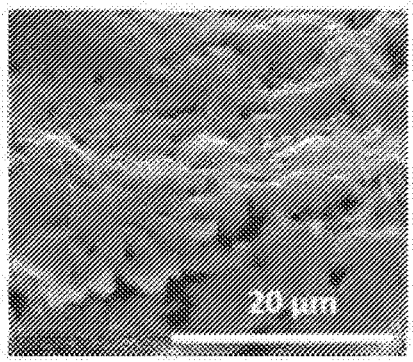
Figure 5C:
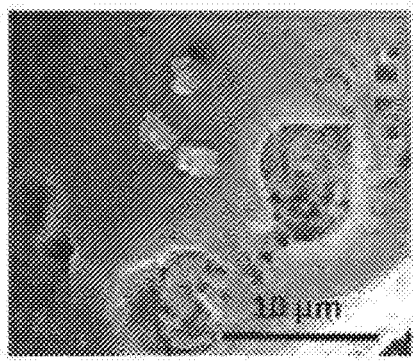
Figure 6A:
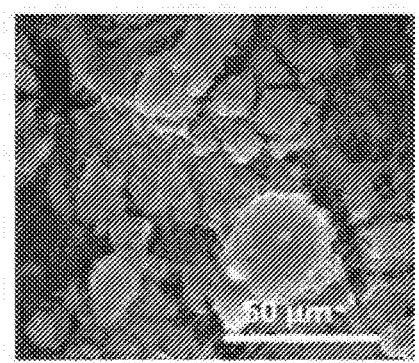
FIGS. 6A-6C are SEM images of a Carbon 2 substrate at different resolutions.
Figure 6B:
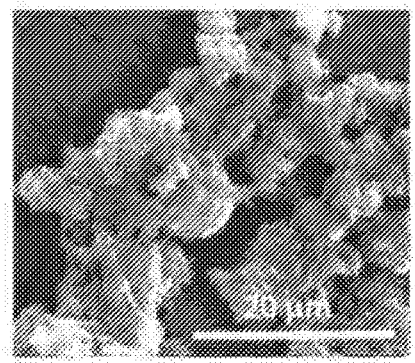
Figure 6C:
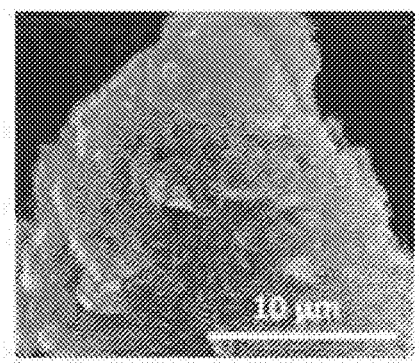
Figure 7A:
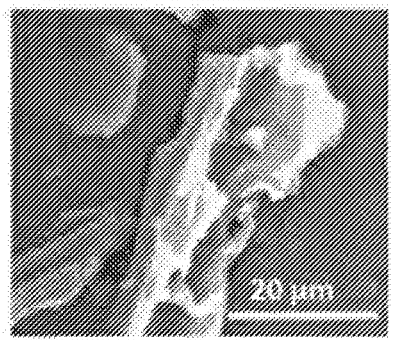
FIGS. 7A-7C are SEM images of a Carbon 3 substrate at different resolutions.
Figure 7B:
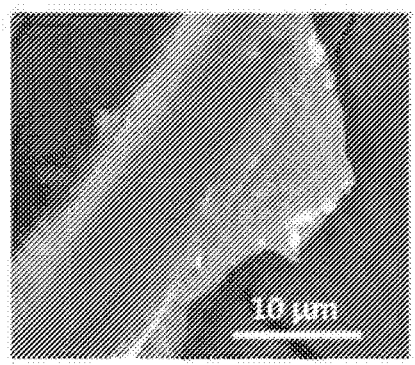
Figure 7C:
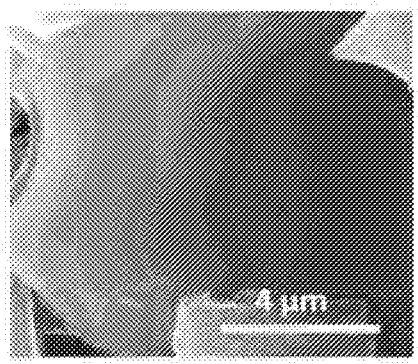
Figure 8A:
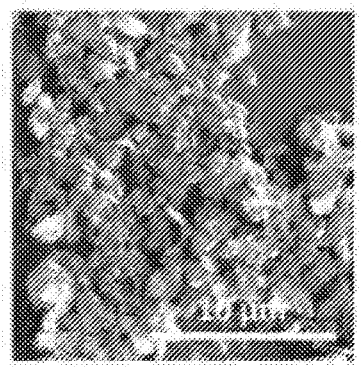
FIGS. 8A-8C are SEM images of a Carbon 4 substrate at different resolutions.
Figure 8B:
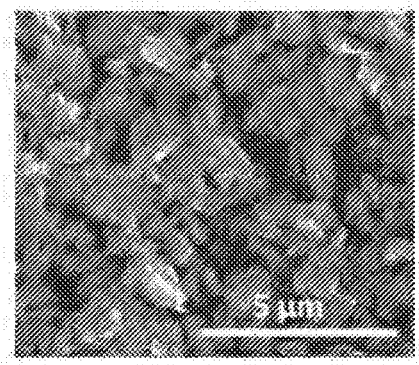
Figure 8C:
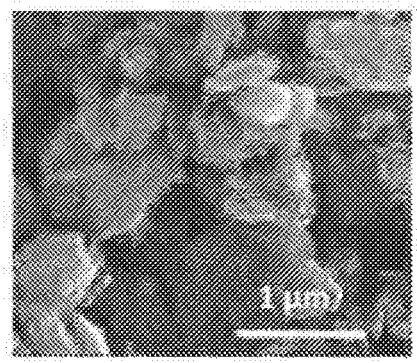
Figure 9A:
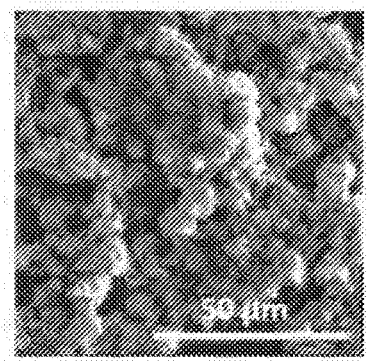
FIGS. 9A-9C are SEM images of a Carbon 5 substrate at different resolutions.
Figure 9B:
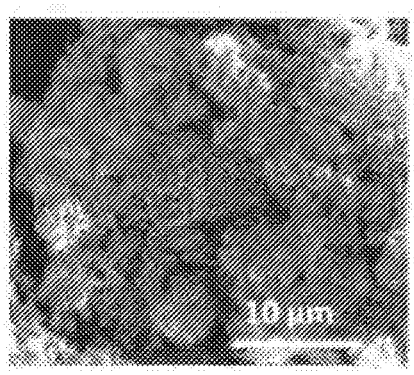
Figure 9C:
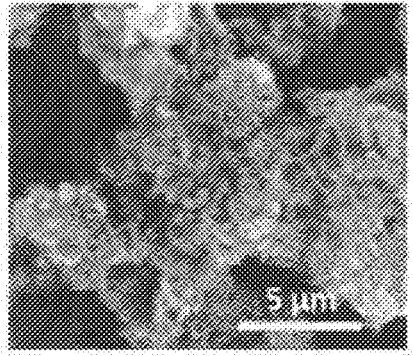
Figure 10A:
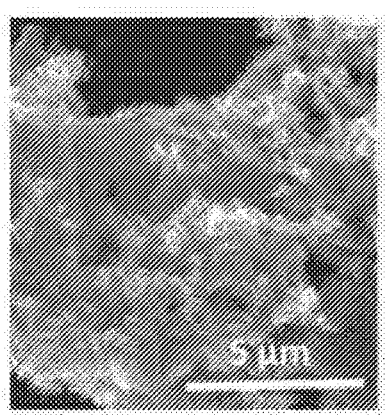
FIGS. 10A-10C are SEM images of the Carbon 1 substrate of FIG. 5 having metallic nanoparticles at different resolutions.
Figure 10B:
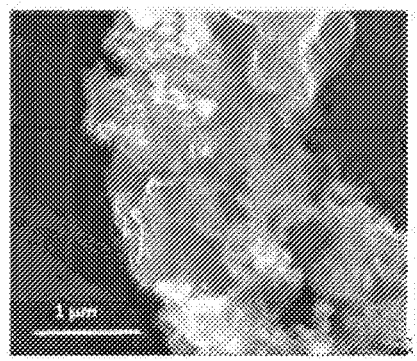
Figure 10C:
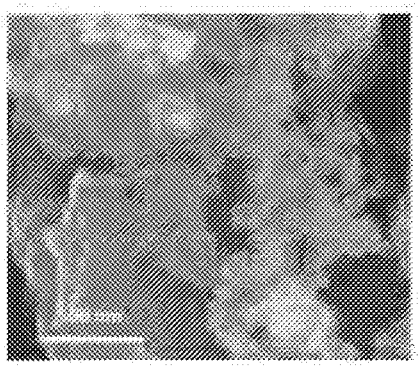
Figure 11A:
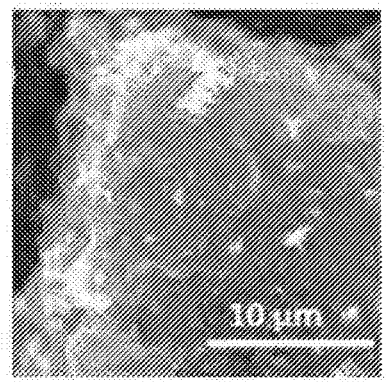
FIGS. 11A-11C are SEM images of the Carbon 2 substrate of FIG. 6 having metallic nanoparticles at different resolutions.
Figure 11B:
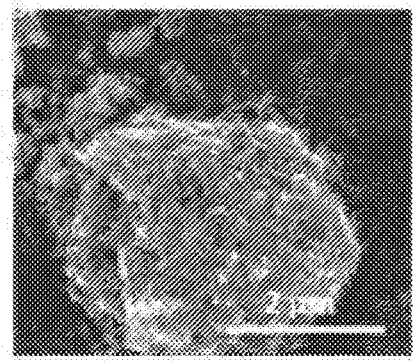
Figure 11C:
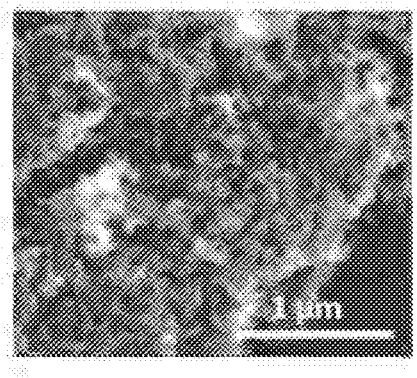
Figure 12A:
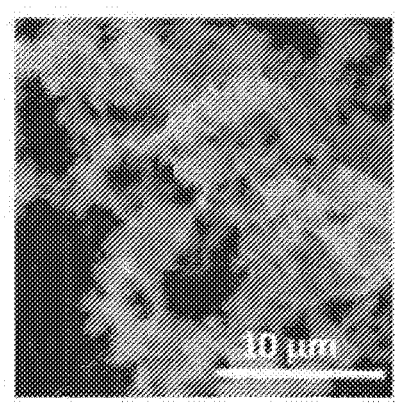
FIGS. 12A-12C are SEM images of the Carbon 3 substrate of FIG. 7 having metallic nanoparticles at different resolutions.
Figure 12B:
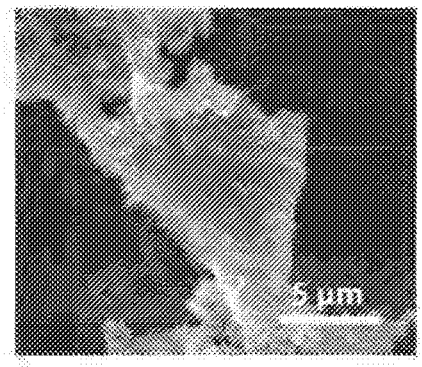
Figure 12C:
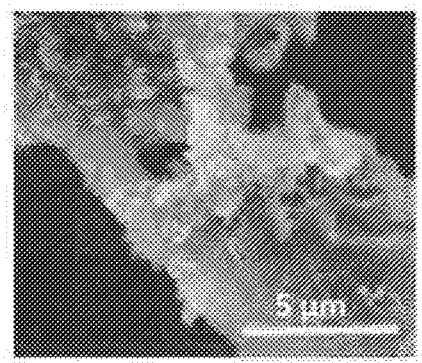
Figure 13A:
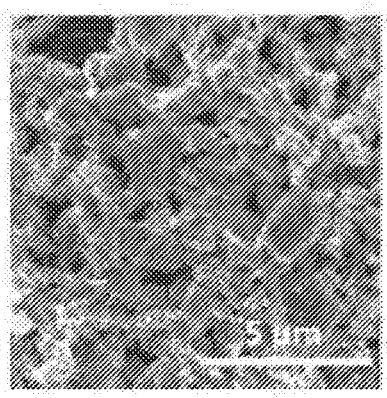
FIGS. 13A-13C are SEM images of the Carbon 4 substrate of FIG. 8 having metallic nanoparticles at different resolutions.
Figure 13B:
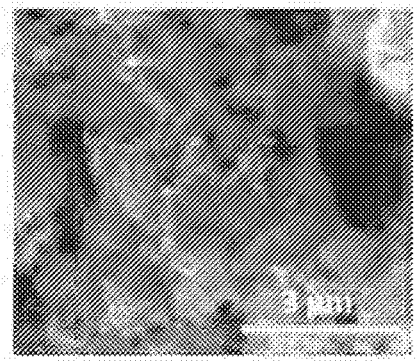
Figure 13C:
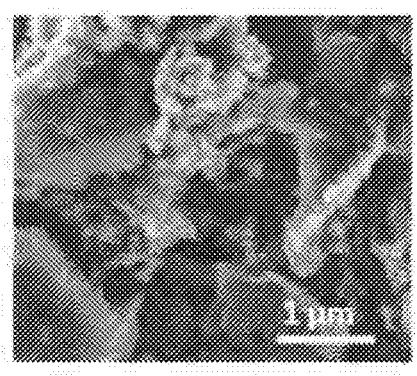
Figure 14A:
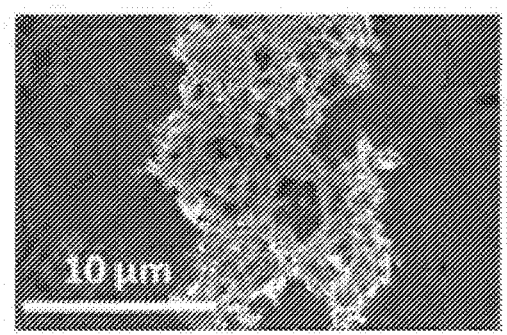
FIGS. 14A-14C are SEM images of the Carbon 5 substrate of FIG. 9 having metallic nanoparticles at different resolutions.
Figure 14B:
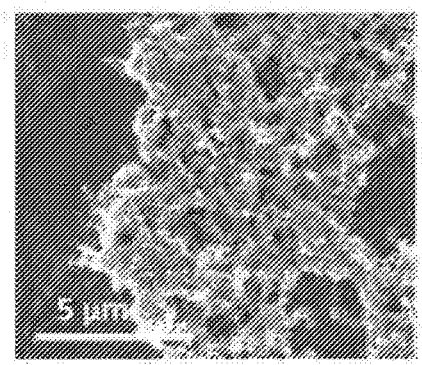
Figure 14C:
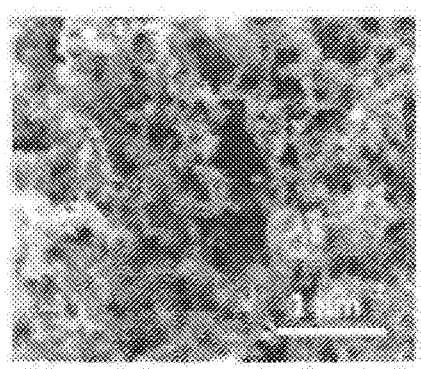

Five different carbon substrates, Carbon 1, Carbon 2, Carbon 3, Carbon 4, and Carbon 5, were prepared as representative embodiments of a composite described herein. Scanning Electron Microscopy (SEM) (Nova Nanolab 200, 15 kV) images at different resolutions were obtained for Carbon 1 (FIGS. 5A-5C), Carbon 2 (FIGS. 6A-6C), Carbon 3 (FIGS. 7A-7C), Carbon 4 (FIGS. 8A-8C), and Carbon 5 (FIGS. 9A-9C) substrates without metallic nanoparticles.

The five different carbon substrates shown in FIGS. 5-9 were coated with a metallic nanoparticle described herein, to give composite metallic nanoparticles coated on the representative carbon substrates. SEM images at different resolutions were acquired, and the presence of the metallic nanoparticles on the carbon surface is readily observable from SEM images. SEM (Nova Nanolab 200, 15 kV) images of composite metallic nanoparticles on Carbon 1, composite metallic nanoparticles on Carbon 2, composite metallic nanoparticles on Carbon 3, composite metallic nanoparticles on Carbon 4, and composite metallic nanoparticles on Carbon 5 are shown in FIGS. 10A-10C, FIGS. 11A-11C, FIGS. 12A-12C, FIGS. 13A-13C, and FIGS. 14A-14C, respectively.

Surface areas of each carbon substrate were measured on a Quantachrome Autosorb-IQ gas sorption analyzer via nitrogen adsorption isotherms. Adsorption tests were run at 77 K. All the carbon samples were degassed at 60, 80, 100, and 120° C. for 1 hour then ramped to the maximum temperature 150 for overnight degassing. Brunauer-Emmett-Teller (BET) equation was used to determine the surface area of the carbon samples. A total pore volume was calculated using Non-Local Density Functional Theory (NLDFT) and V tag on the Tabular Data portion. The data are collected in Table III.

TABLE III

BET Surface area and DFT total pore volume for carbon samples.

| Sample | BET Surface area (m$^2$/g) | DFT Pore Volume cc/g |
|---|---|---|
| Carbon 1 | 1288.282 | 0.526 |
| Carbon 2 | 1565.008 | 2.872 |
| Carbon 3 | 3.216 | 0.005 |
| Carbon 4 | 269.061 | 0.302 |
| Carbon 5 | 261.731 | 0.340 |

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:
1. A composite particle comprising:
an electrically conductive substrate;
composite metallic or metal oxide nanoparticles supported by the substrate, the composite metallic nanoparticles comprising iron and at least one additional transition metal; and
an amphiphilic or hydrophilic component associated with the substrate, wherein the amphiphilic or hydrophilic component comprises one or more amphiphilic or hydrophilic polymeric species.

2. The composite particle of claim 1, wherein the substrate has an average primary particle size in three dimensions of 30 nanometers to 50 micrometers.

3. The composite particle of claim 1, wherein the substrate is porous.

4. The composite particle of claim 1, wherein the substrate comprises electrically conductive carbon-containing material.

5. The composite particle of claim 1, wherein some portion of the iron in the composite exhibits an oxidation state of 0.

6. The composite particle of claim 1, wherein the nanoparticles are stabilized by a phosphonic acid-based stabilizing agent.

7. The composite particle of claim 1, wherein the at least one additional transition metal is selected Group VIIIB of the Periodic Table.

8. The composite particle of claim 7, wherein the additional transition metal is nickel.

9. The composite particle of claim 1, wherein the metallic nanoparticles have core-shell or alloy architecture.

10. The composite particle of claim 9, wherein the core comprises the iron and the shell comprises the at least one additional transition metal.

11. The composite particle of claim 1, wherein the amphiphilic or hydrophilic component comprises one or more amphiphilic or hydrophilic polymeric species.

12. The composite particle of claim 1, wherein the amphiphilic or hydrophilic polymeric species comprise polyvinylpyrrolidone or a derivative thereof.

13. The composite particle of claim 1, wherein the amphiphilic or hydrophilic polymeric species further comprises a phosphonic acid stabilizing agent or a derivative thereof.

14. The composite particle of claim 1, wherein the amphiphilic or hydrophilic component forms a coating of the composite particle.

15. The composite particle of claim 1, wherein the one or more amphiphilic or hydrophilic polymeric species reside between the substrate and composite metallic or metal oxide nanoparticles.

16. The composite particle of claim 1, wherein the nanoparticles consist of metal oxide nanoparticles.

17. A method of water remediation comprising:
contacting a water source comprising one or more contaminants with a remediation composition, the remediation composition comprising composite particles, the composite particles comprising a substrate comprising electrically conductive carbon-containing material, composite metallic or metal oxide nanoparticles supported by the substrate, and an amphiphilic or hydrophilic component associated with the substrate, wherein the composite metallic nanoparticles comprises iron and at least one additional transition metal, and the amphiphilic or hydrophilic component comprises one or more amphiphilic or hydrophilic polymeric species.

18. The method of claim 17 further comprising reductively transforming the one or more contaminants with the composite particles.

19. The method of claim 17, wherein the one or more contaminants comprise heavy metals, nitroaromatic compounds, petroleum byproducts, chlorinated solvents, other halogenated compounds, or various combinations thereof.

20. The method of claim 17, wherein the one or more contaminants are reduced by the composite metallic nanoparticles.

21. The method of claim 17, wherein the one or more contaminants are reduced by the substrate.

\* \* \* \* \*